US006674787B1

United States Patent
Dick et al.

(10) Patent No.: US 6,674,787 B1
(45) Date of Patent: Jan. 6, 2004

(54) RAISING RANDOM ACCESS CHANNEL PACKET PAYLOAD

(75) Inventors: Stephen G. Dick, Nesconset, NY (US); Eldad Zeira, Trumbull, CT (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/574,792

(22) Filed: May 19, 2000

Related U.S. Application Data

(60) Provisional application No. 60/134,899, filed on May 19, 1999.

(51) Int. Cl.[7] .......................... H04B 15/00; H04K 1/00; H04L 27/30
(52) U.S. Cl. .................. 375/130; 455/522; 375/135
(58) Field of Search ................. 375/130, 133, 375/135, 146, 295; 455/522; 370/278

(56) References Cited

U.S. PATENT DOCUMENTS 5,224,120 A  *  6/1993  Schilling .................... 375/130
6,160,803 A  * 12/2000  Yuen et al. ................. 370/342
6,262,971 B1 *  7/2001  Schilling .................... 370/208

OTHER PUBLICATIONS

3rd Generation Partnership Project (3GPP), "Technical Specification Group Radio Access Network; Physical Channels and Mapping of Transport Channels Onto Physical Channels (FDD)," 3G TS 25.211, V3.3.0 (2000–06) (Release 1999), pp. 1–42.

* cited by examiner

Primary Examiner—Mohammad H. Ghayour
(74) Attorney, Agent, or Firm—Volpe and Koenig, P.C.

(57) ABSTRACT

A data packet is provided for transmission having a first processing gain for reception at a first power level or higher. The data packet is modified prior to transmission such that the data packet has a preamble wherein data in the preamble has a second processing gain higher than the first processing gain for reception at a second power level lower than the first power level or higher. The user equipment unit transmits the modified data packet over the random access channel at a power level such that the modified data packet is initially received at the base station at least the second power level. The transmission power level is adaptively controlled while the preamble data is transmitted such that the base station receives the data of the data packet having the first processing gain at least the first power level.

13 Claims, 4 Drawing Sheets

RAISING RANDOM ACCESS CHANNEL PACKET PAYLOAD

This application claims priority from U.S. Provisional Application No. 60/134,899, filed May 19, 1999.

BACKGROUND

The invention relates generally to random access channels in a wireless code division multiple access communication system. More specifically, the invention relates to raising the packet data payload of packets transferred over a random access channel.

FIG. 1 depicts a wireless spread spectrum Code Division Multiple Access (CDMA) communication system 20. A base station 22 communicates with user equipment units (UEs) $24_1$–$24_n$ in its operating area. In a spread spectrum CDMA system 18, data signals are communicated between UEs $24_1$–$24_n$ and the base station 22 over the same spectrum. Each data signal in the shared spectrum is spread with a unique chip code sequence. Upon reception, using a replica of the chip code sequence, a particular data signal is recovered.

Since signals are distinguished by their chip code sequences (code), separate dedicated communication channels are created using different codes. Signals from the base station 22 to the UEs $24_1$–$24_n$ are sent on downlink channels and signals from the UEs $24_1$–$24_n$ to the base station 22 are sent on uplink channels. For coherent detection of downlink transmissions by the UEs $24_1$–$24_n$, pilot signals are transmitted to all the UEs $24_1$–$24_n$ within the base station's operating range. The UEs $24_1$–$24_n$ condition their receivers based on the pilot signals to enable data reception.

In many CDMA systems 20, random access channels are used by multiple users. One random access channel is a common packet channel (CPCH) which is used for uplink transmissions. A CPCH is capable of carrying packets of data from different UEs $24_1$–$24_n$. Each UE's packets have an associated uplink scrambling code which distinguishes it from other UE's packets. The CPCH is typically used to carry infrequently communicated data at high rates.

The CPCH as shown in FIG. 2 is time divided into frames $30_1$–$30_m$ having time slots $24_1$–$28_n$, such as eight time slots proposed for the Third Generation Mobile Telecommunications System (IMT-2000)-UMTS. The UE $24_1$ transmits a data packet over the CPCH using an assigned uplink scrambling code starting in a specific time slot. The packet typically lasts for multiple frames $30_1$–$30_m$. The uplink packets are used to carry data and control signals. The base station 22 receives and recovers data from the uplink data packet. Typically, a dedicated downlink control channel is established for use in sending control signals from the base station 22 to the UE $24_1$ as well as other data.

FIG. 3 is a simplified UE $24_1$ and base station 22 for transmitting and receiving packet data over a random access channel 42 in a CDMA system 20. A data packet is generated by a data packet generator 32 at the UE $24_1$. The data is subsequently encoded for error protection, such as by convolutional encoding, by an encoder 34. The encoded data is spread by a spreading device 36, such as by mixing the encoded data with a spreading code. The spread data is modulated to radio frequency by a modulator 38 and radiated by the UE's antenna 40.

The radio frequency signal is sent through a random access channel 42, such as the CPCH, to the base station 22. An antenna 44 at the base station 22 receives radio signals. The radio signals are demodulated by a demodulator 46 to produce a baseband signal. The baseband signal is despread by a despreading device 48, such as by mixing the baseband signal with a replica of the original spreading code. The de-spread signal is passed through a decoder 50 to recover the original data packet.

CDMA systems 20 typically use some form of adaptive power control. In a CDMA system 20, many signals share the same spectrum. When a UE $24_1$ or base station 22 receives a specific signal, all the other signals within the same spectrum are noise-like in relation to the specific signal. Increasing the power level of one signal degrades all the other signals within the same spectrum. However, reducing transmission power levels too far results in undesirable received signal quality at the receivers. To maintain a desired signal quality at the minimum transmission power level, transmission power control is used.

Along with other data, both the UE $24_1$ and base station 22 send transmission power control (TPC) signals. The TPC signals tell the receiving UE $24_1$ or base station 22 to increase or decrease its transmission power level based on the quality of the received signals. Once the UE $24_1$ or base station 22 receives the TPC signals, it adjusts its transmission power level accordingly. For signals sent from the UE $24_1$ to the base station 22 on the CPCH, typically, a closed loop power control preamble (CLPC-Preamble) is used to carry the TPC signals. The CLPC-Preamble precedes other data being carried in the packet.

To assure that the initial power level of uplink communications is not set too high, the UE 24 initially sets its transmission power level at a sufficiently low power level. The initial power level is set such that it is highly unlikely that the transmitted data will cause a degradation to reception of other UEs. Both the UE $24_1$ and base station 22 have their transmission power levels adjusted to a desired transmission power level by the corresponding uplink and downlink TPC signals.

Until either the UE $24_1$ or base station 22 reaches a sufficient transmission power level, no data is being transferred. This lack of data transfer is an inefficient use of the systems resources and is undesirable. Accordingly, it is desirable to increase data transfer in such systems.

SUMMARY

A data packet is provided for transmission having a first processing gain for reception at a first power level or higher. The data packet is modified prior to transmission such that the data packet has a preamble wherein data in the preamble has a second processing gain higher than the first processing gain for reception at a second power level lower than the first power level or higher. The user equipment unit transmits the modified data packet over the random access channel at a power level such that the modified data packet is initially received at the base station at least the second power level. The transmission power level is adaptively controlled while the preamble data is transmitted such that the base station receives the data of the data packet having the first processing gain at least the first power level.

DETAILED DESCRIPTION OF THE PREFERRED EMBODIMENTS

Figure 4:
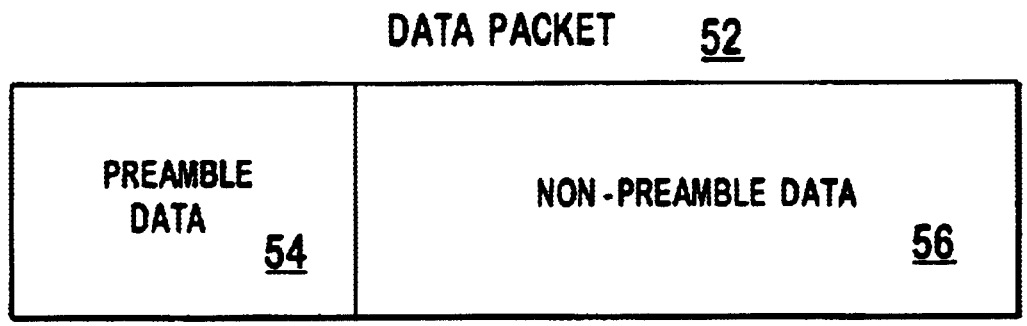
FIG. 4 is an illustration of a data packet.

FIG. 4 is an illustration of a data packet 52. The data packet 52 has preamble 54 and non-preamble data 56. The length of the preamble may vary for differing systems and channel characteristics. A typical length being one or multiple frames. One type of preamble 54 is a CLPC-Preamble.

Figure 5:
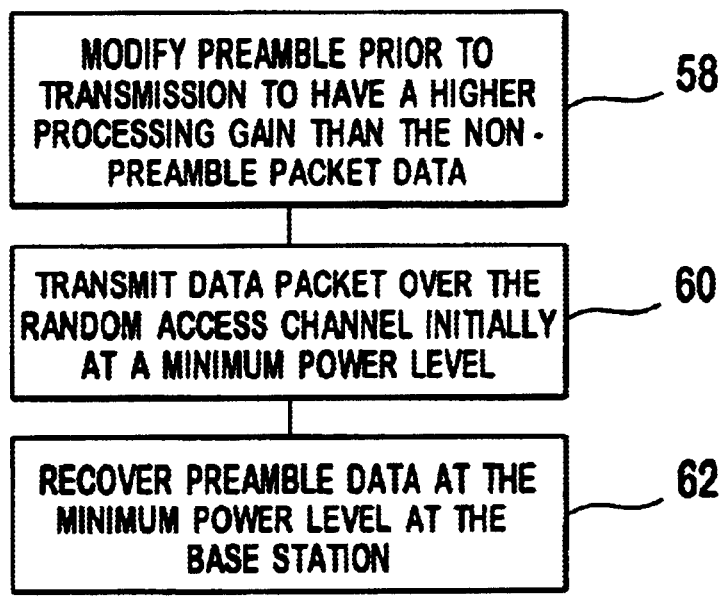
FIG. 5 is a flow chart of raising random access channel payload.

FIG. 5 is a flow chart of raising packet payload. For an initial packet or packets transmitted by the UE $24_1$ over the channel, the preamble 54 of the data packet 52 is modified to have a higher processing gain-than the non-preamble data prior to transmission, 58. For multiple packets, the higher processing gain will be used over a set number of frames. One approach for increasing the processing gain is to encode the preamble 54 at a higher gain than the non-preamble packet data. Another approach is to spread the preamble data 54 with a higher spreading factor than the non-preamble data 56.

Initially, the UE $24_1$ transmits the data packet 52 over the random access channel, such as a CPCH, at a minimum power level, 60. Since the processing gain of the preamble 54 is higher than the non-preamble data 56, data within the preamble is recoverable at the minimum initial power level, 62. As the received TPC signals adjust the UE's transmission power levels, the non-preamble data 56 will also be recoverable. Accordingly, the data throughput of the random access channel is increased. Subsequent packets will not require modification, since the transmission power levels will be at desired levels.

Figure 1:
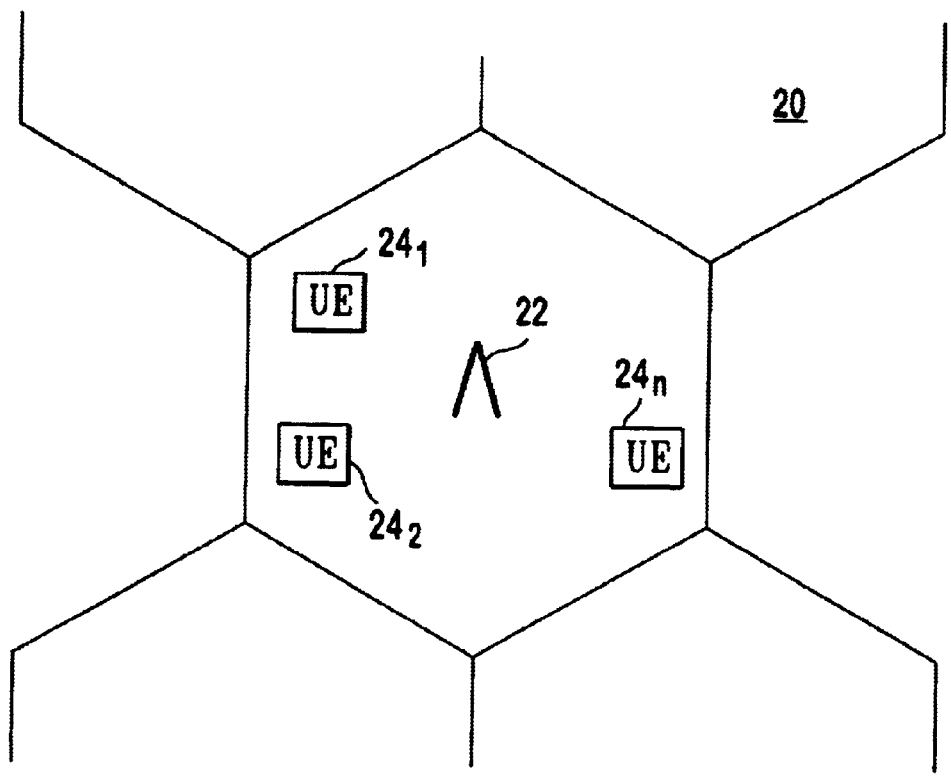
FIG. 1 is an illustration of a typical wireless spread spectrum CDMA communication system.
Figure 2:
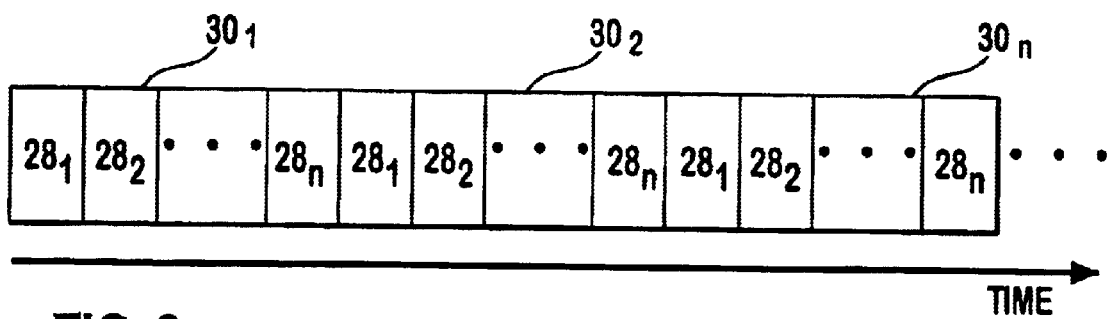
FIG. 2 is an illustration of a common packet channel.
Figure 3:
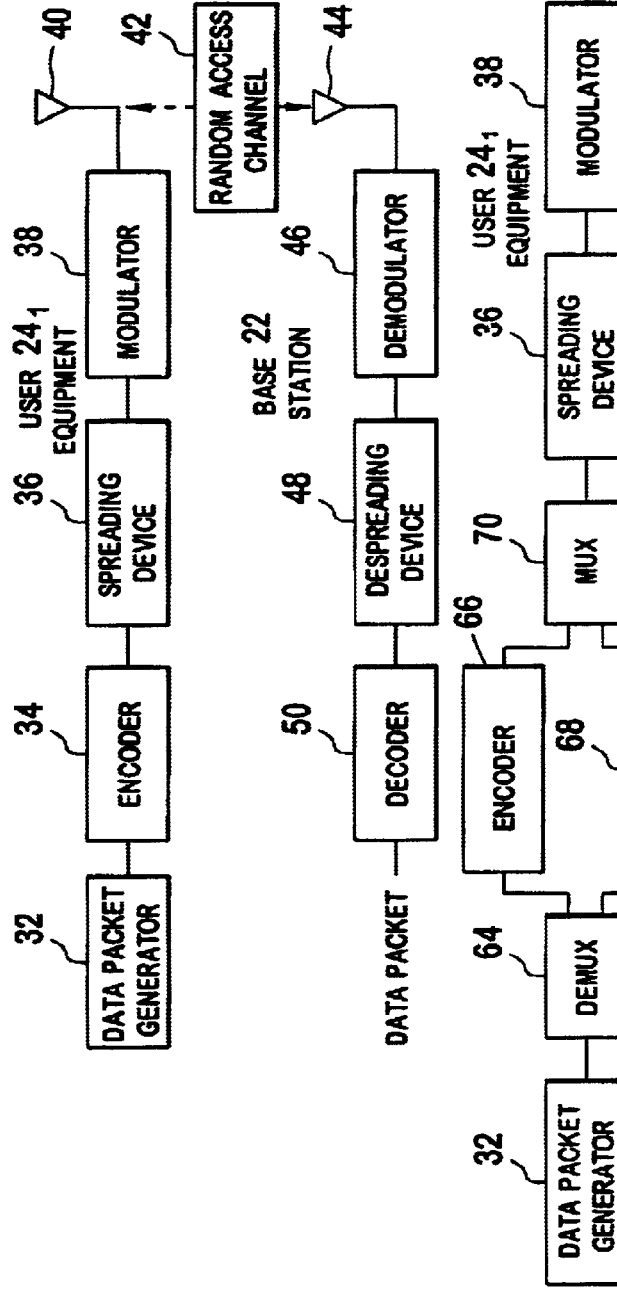
FIG. 3 is a simplified user equipment and base station.
Figure 6:
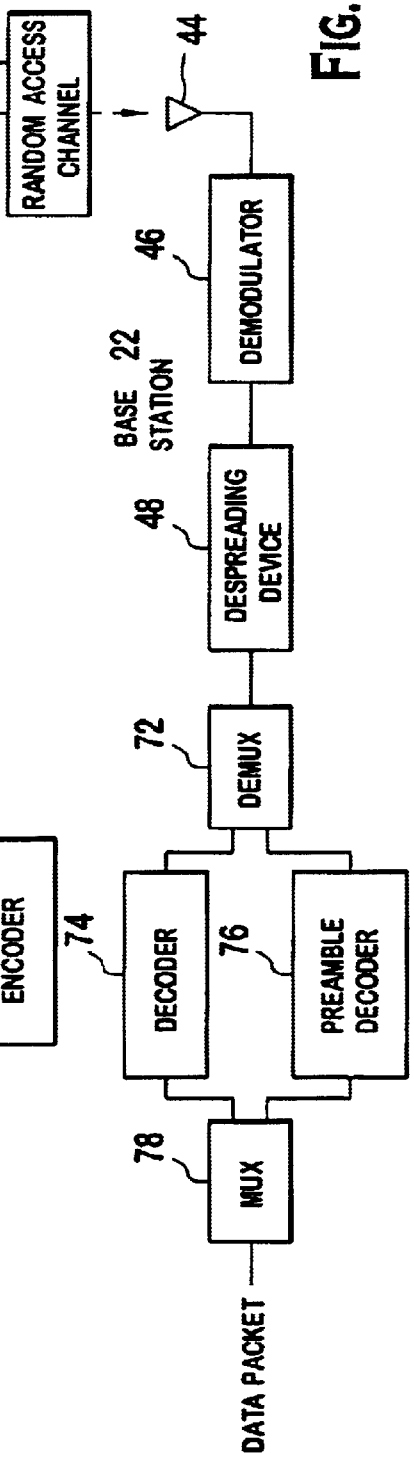
FIG. 6 is a simplified user equipment and base station for encoding a preamble at a higher encoding gain.

FIG. 6 is a simplified UE $24_1$ and base station 22 for use in raising packet payload. A data packet generator 32 generates a data packet 52. The data packet 52 is separated into its preamble and non-preamble packet data, such as by a de-multiplexer 64. The non-preamble packet data is encoded by an encoder 66, such as by a rate ⅞ convolutional encoder, although other encoding schemes may be used. The preamble data is encoded using a preamble encoder 68 at a much higher encoding gain, such as by a rate ½ to ⅓ convolutional encoder. The encoded preamble and non-preamble data are reassembled, such as by a multiplexer 70. The multiplexed packet is spread by a spreading device 36, modulated to radio frequency by a modulator 38 and radiated by an antenna 40.

A base station antenna 44 receives radio frequency signals sent through the random access channel 42. The received radio frequency signals are demodulated by a demodulator 46 to produce a baseband signal. The baseband signal is despread by a despreading device 48. The despread data is separated so that the preamble and the non-preamble data are separated, such as by a demultiplexer 76. A corresponding decoder 74 is used for both the non-preamble and the preamble data to recover the original data, such as by a decoder 74 and preamble decoder 76. The decoded data is reassembled into the original data packet, such as by a multiplexer 78. As a result, the transmitted preamble has a higher encoding gain than the non-preamble data. At the base station $24_1$, the preamble 54 is recoverable at a minimum power level increasing data throughput.

Figure 7:
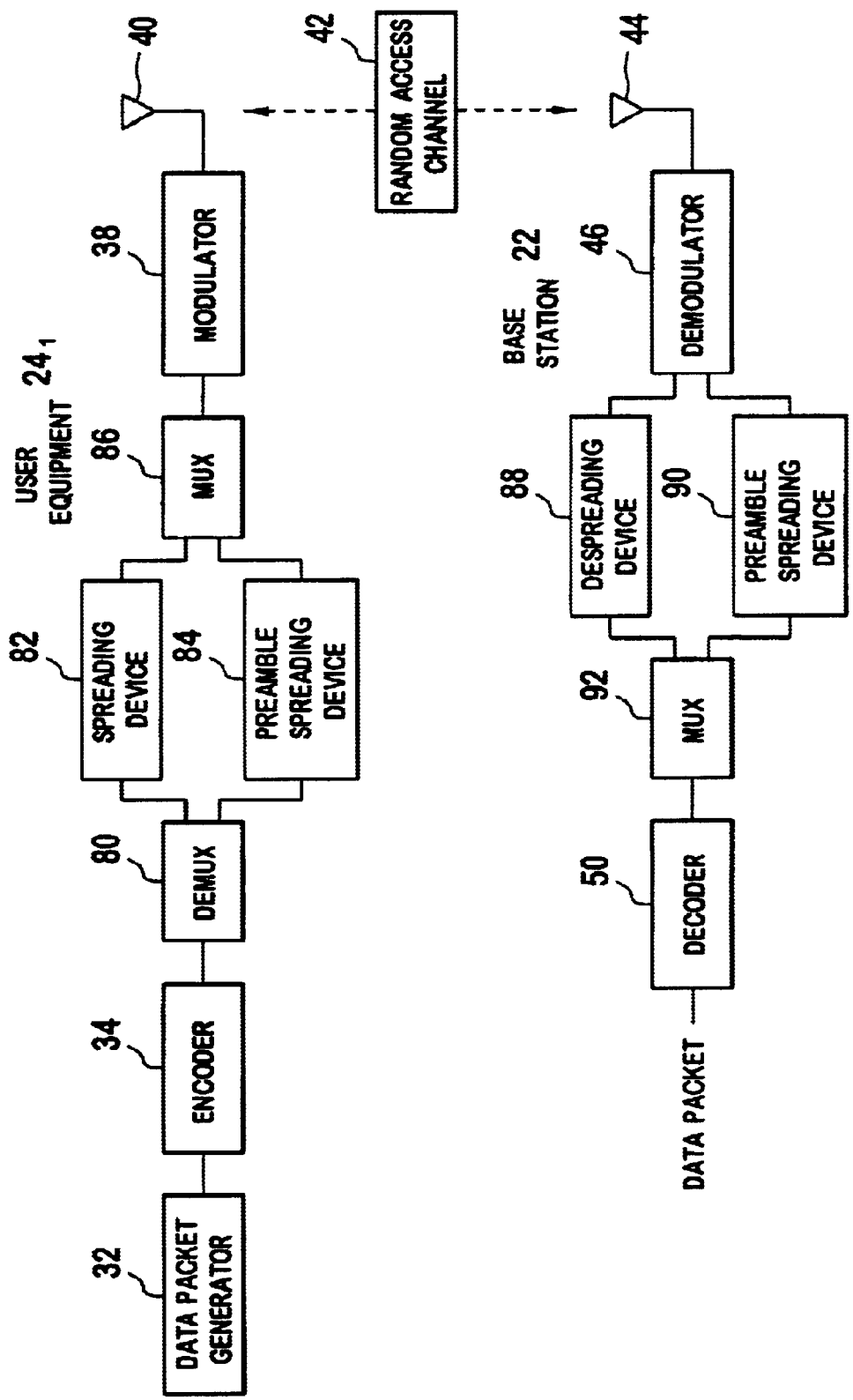
FIG. 7 is a simplified user equipment and base station for spreading a preamble at a higher spreading factor.

FIG. 7 is another simplified UE $24_1$ and base station 22 for raising packet payload. A data packet generator 32 generates a data packet 52. The data packet 52 is error encoded by an encoder 34. The encoded packet is subsequently separated into its preamble and nonpreamble data, such as by a demultiplexer 80. The non-preamble data is spread by a spreading device 82. The preamble is spread by a preamble spreading device 84 having a spreading factor higher than the non-preamble data spreading device 82. The spread preamble and spread non-preamble data are combined, such as by a multiplexer 86. The multiplexed data packet is modulated to radio frequency by the modulator 38 and radiated by an antenna 40.

A base station antenna 44 receives radio frequency signals sent through the random access channel 42. The received radio frequency signals are demodulated by a demodulator 46 to produce a baseband signal. The baseband signal is processed using corresponding replicas of the spreading codes used to originally spread the preamble and non-preamble data, such as by a despreading device 88 and a preamble despreading device 90. The despread preamble and packet data are reassembled, such as by a multiplexer 92. The multiplexed packet is decoded, such as by a decoder 50, to retrieve the original data packet.

As a result, the transmitted preamble 54 has a higher spreading factor than the non-preamble data 56. At the base station 22, the preamble data 54 is recoverable at the minimum initial power level.

What is claimed is:

1. A method for transferring data over a random access channel in a wireless spread spectrum code division multiple access communication system, the system having a base station and a user equipment unit, communication between the base station and user equipment unit is conducted at a power level which may vary and is controlled by adaptive power control, the method comprising:

providing a data packet for transmission having a first processing gain for reception at a first power level or higher;

modifying the data packet prior to transmission such that the data packet has a preamble wherein data in the preamble has a second processing gain higher than the first processing gain for reception at a second power level lower than the first power level;

transmitting from the user equipment unit the modified data packet over the random access channel at a power level such that the modified data packet is initially received at the base station, at least the second power level; and adaptively controlling the transmission power level while the preamble data is transmitted such that the base station receives the data of the data packet having the first processing gain at least the first level.

2. The method of claim 1 wherein the first processing gain is a first error encoding gain and the second processing gain is a second error encoding gain.

3. The method of claim 2 wherein the first and second error encoding gains are a result of processing the data packet with a first and second convolutional encoder, respectively.

4. The method of claim 3 wherein the first convolutional encoder is a ⅞ convolutional encoder and the second convolutional encoder is a convolutional encoder in the range of a ⅓ to ½ convolutional encoder.

5. The method of claim 1 wherein the first processing gain is a first spreading factor and the second processing gain is a second spreading factor.

6. The method of claim 1 wherein the random access channel is a common packet channel.

7. A method for transferring data over a random access channel in a wireless spread spectrum code division multiple access communication system, the system having a base station and a user equipment unit, communication between the base station and user equipment unit is conducted at a power level which may vary and is controlled by adaptive power control, the method comprising:

provided data packets for transmission having a first processing gain for reception at a first power level or higher, the data packets having a duration of a set of frames;

modifying an initial subset of frames of the set prior to transmission such that data in the subset frames has a second processing gain higher than the first processing gain for reception at a second power level lower than the first power level;

transmitting from the user equipment unit the modified data packets over the random access channel at a power level such that the modified data packets are initially received at the base station, at least the second power level; and adaptively controlling the transmission power level while the subset frames data is transmitted such that the base station receives the data of the subset frames having the first processing gain at least the first level.

8. A wireless spread spectrum code division multiple access communication system, the system having a base station and a user equipment unit, communication between the base station and user equipment unit is conducted at a power level which may vary and is controlled by adaptive power control, the system comprising:

the user equipment unit having:
means for providing a data packet for transmission having a first processing gain for reception at a first power level or higher;

means for modifying the data packet prior to transmission such that the data packet has a preamble wherein data in the preamble has a second processing gain higher than the first processing gain for reception at a second power level lower than the first power level; and means for transmitting the modified data packet over the random access channel at a power level such that the modified data packet is initially received at the base station, at least the second power level; and the base station having:
means for adaptively controlling the transmission power level while the preamble data is transmitted such that the base station receives the data of the data packet having the first processing gain at least the first level.

9. The system of claim 8 wherein the first processing gain is a first error encoding gain and the second processing gain is a second error encoding gain.

10. The system of claim 9 wherein the first and second error encoding gains are a result of processing the data packet with a first and second convolutional encoder, respectively.

11. The system of claim 10 wherein the first convolutional encoder is a ⅞ convolutional encoder and the second convolutional encoder is a convolutional encoder in the range of a ⅓ to ½ convolutional encoder.

12. The system of claim 8 wherein the first processing gain is a first spreading factor and the second processing gain is a second spreading factor.

13. The system of claim 8 wherein the random access channel is a common packet channel.

\* \* \* \* \*

UNITED STATES PATENT AND TRADEMARK OFFICE
CERTIFICATE OF CORRECTION

PATENT NO. : 6,674,787 B1
DATED : January 6, 2004
INVENTOR(S) : Dick et al.

It is certified that error appears in the above-identified patent and that said Letters Patent is hereby corrected as shown below:

Column 4,
Lines 46 and 51, before the phrase "at least", insert -- at --.

Column 5,
Lines 21 and 26, before the phrase "at least", insert -- at --.

Column 6,
Lines 11 and 16, before the phrase "at least", insert -- at --.

Signed and Sealed this

Sixth Day of July, 2004

JON W. DUDAS
*Acting Director of the United States Patent and Trademark Office*